INVENTOR.
Morton L. Lieberman

United States Patent Office 3,681,109
Patented Aug. 1, 1972

3,681,109
AMORPHOUS BISMUTH OXIDE CONTAINING COATINGS
Morton L. Lieberman, Albuquerque, N. Mex., assignor to Corning Glass Works, Corning, N.Y.
Filed May 6, 1970, Ser. No. 35,105
Int. Cl. B29d 11/00; C03c 17/22
U.S. Cl. 117—33.3                                    6 Claims

ABSTRACT OF THE DISCLOSURE

A method of depressing the extinction coefficient of bismuth oxide containing films comprising combining with the bismuth oxide at least one non-absorbing metal oxide. In films wherein the atomic ratio of bismuth to the other metal is between 0.5 and 2.0, the refractive index is greater than 2.0 and the extinction coefficient is less than 0.005.

BACKGROUND OF THE INVENTION

This invention relates to amorphous bismuth oxide containing films having high refractive indices and low extinction coefficients.

Amorphous films having low extinction coefficients and high refractive indices are useful for such optical applications as multilayer film combinations used for antireflection coatings, interference coatings and coatings for electroluminescent and other light emitting devices which require high refractive index coatings for the efficient radiation of light therefrom. Transparent films having desirable chemical and optical properties are particularly useful. Such properties include resistance to attack by strong acids and bases, devitrification resistance and a refractive index above 2.0.

Some single oxide amorphous films exhibit either a high refractive index or a low extinction coefficient but not both of these necessary properties. For example, an amorphous film of $Bi_2O_3$ has a refractive index of about 2.5 at $\lambda=5461$ A., but it also has a high extinction coefficient of 0.11 at $\lambda=4500$ A. Extinction coefficient values are compared at the lower wavelength since differences are more evident in that range. Therefore, amorphous films of pure $Bi_2O_3$ are unsatisfactory for use as optical films.

SUMMARY OF THE INVENTION

It is therefore an object of this invention to provide a family of amorphous bismuth oxide containing films having high refractive indices, low extinction coefficients, resistance to attack by chemicals and devitrification resistance.

Another object of this invention is to provide a family of additives for depressing the extinction coefficient of bismuth oxide containing films.

Briefly, the method of this invention results in depressing the extinction coefficient of bismuth oxide containing films while retaining a refractive index greater than 2.0. This method comprises combining with bismuth oxide an oxide of at least one metal selected from the group consisting of antimony, tellurium, tantalum, tungsten and combinations thereof until the ratio of the atomic ratio of bismuth to the other metal is between 0.5 and 2.0. Preferred bismuth oxide containing films have atomic ratios between 1.0 and 1.5 wherein the refractive index is greater than 2.15 and the extinction coefficient is less than 0.001.

DETAILED DESCRIPTION

The amorphous, mixed oxide films to which the present invention relates were prepared by the reactive sputtering technique. Due to the particular oxide states of the metal oxides of which these films consist, it is doubtful whether other techniques can be used to form them. Since this invention is concerned only with mixed oxide films, either multiple cathodes or alloy cathodes should be used in the sputtering apparatus. All of the films to be hereinafter described were deposited by a multi-cathode sputtering apparatus. For a description of a multi-cathode sputtering apparatus, reference may be made to the publication "Controlled Preparation of Alloys by Simultaneous Multitarget Sputtering" by P. R. Segatto, Journal of Vacuum Science and Technology, May/June, 1969, vol. 6, No. 3, pp. 368–372.

Figure 1:
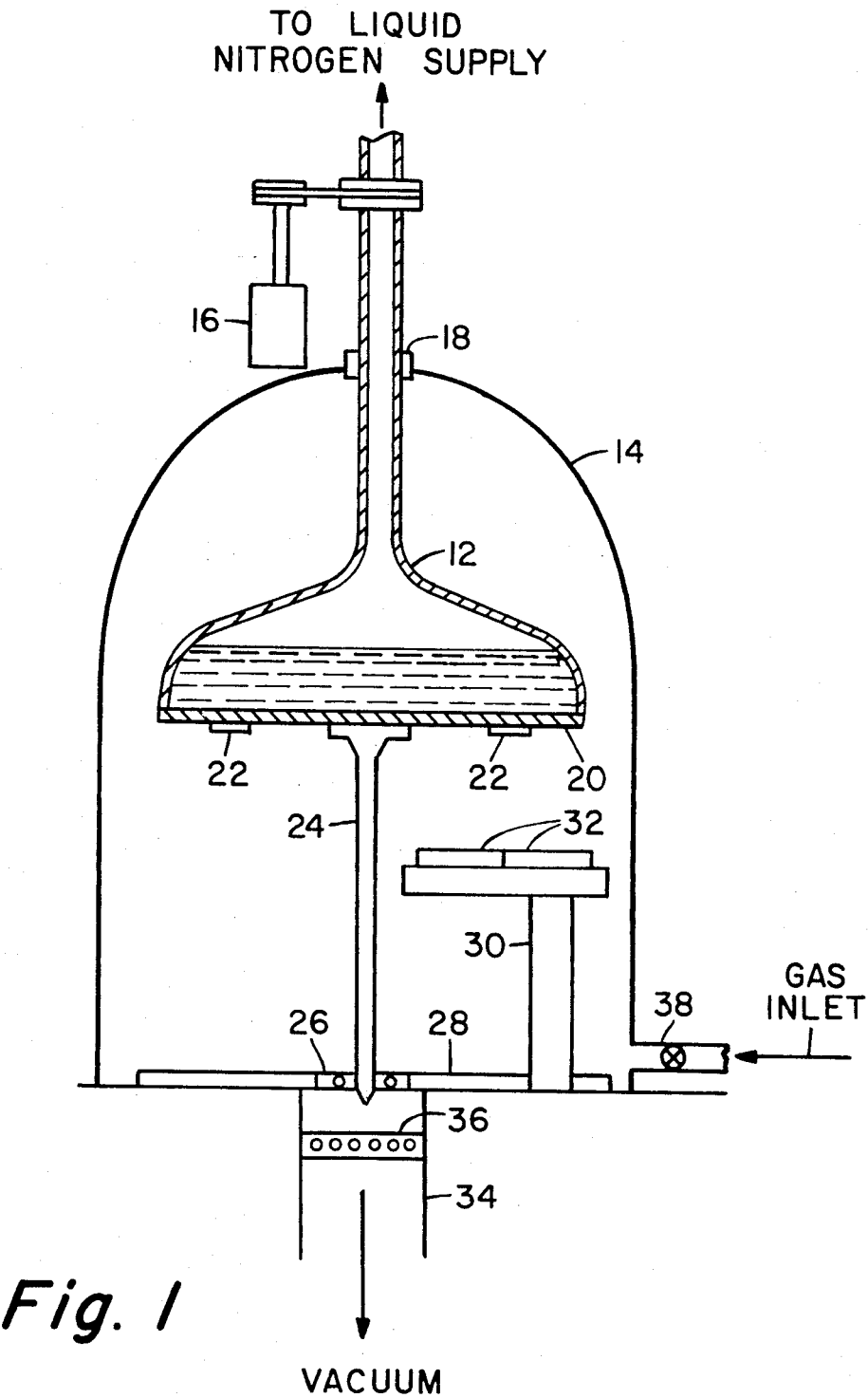
FIG. 1 is a schematic diagram illustrating a type of sputtering apparatus for depositing the films to which the present invention relates.

The basic sputtering unit, shown schematically in FIG. 1, is a modified Edwards evaporation plant. A television tube-shaped stainless steel Dewar 12 extends through the top of a bell jar 14. A rotary motor 16 is connected to Dewar 12 by a pulley arrangement, a rotary seal 18 being provided at the top of bell jar 14 where the Dewar passes therethrough. Affixed to the bottom of the Dewar is a circular copper plate 20 to which a plurality of a substrates 22 is affixed. The Dewar is filled with liquid nitrogen to a height approximately three inches above the copper plate before sputtering is initiated. This height of liquid nitrogen may be automatically maintained by means of a liquid level controller which is connected to a liquid nitrogen supply (not shown). A stainless steel post 24, which is affixed to the bottom of the copper plate 20 fits into a bearing 26 which is attached to the baseplate 28. Wobble of the Dewar caused by its rotation is minimized by this post. A support 30 maintains a plurality of metal cathodes 32 in a proper relationship with respect to substrates 22.

A vacuum in the range of $10^{-6}$ to $10^{-7}$ torr is maintained in the bell jar by vacuum line 34 which contains a chevron baffle 36. Reactive sputtering was usually performed in a 1:1 argon-oxygen gas mixture which was supplied through pipe 38. This mixture is not critical, and sputtering may be performed in an atmosphere of pure oxygen; however, an argon-oxygen mixture permits faster film formation than oxygen alone.

The interrelationships between film composition and optical properties will be considered in detail for bismuth-tellurium oxide films. Thereafter other mixed oxide films containing bismuth oxide will be briefly discussed to show that in all of the films containing bismuth oxide and at least one non-absorbing metal oxide, the latter constituent depressed the extinction coefficient of the bismuth oxide, thereby providing an amorphous film having a high refractive index and low extinction coefficient. As used herein, the term "non-absorbing" means virtually colorless and having a relatively low extinction coefficient.

Mixed-oxide films were prepared by the simultaneous reactive sputtering of bismuth and tellurium cathodes in a 1:1 Ar-$O_2$ gas mixture in the previously described sputtering apparatus. The voltages applied to the individual cathodes were independently varied to obtain films of different compositions. Glass substrates were refrigerated with liquid nitrogen and rotated above the cathodes at a rate of about 120 r.p.m. In order to minimize layering in the films, the deposition never exceeded 0.6 A. per substrate revolution.

The sputtering parameters and the resultant film compositions are given in Table I. The voltages and currents given in this table are the voltages applied to the cathodes and the currents flowing therethrough. The film thicknesses listed in Table I were determined by multiple-beam interferometry.

TABLE I

|  | Example | | | |
| --- | --- | --- | --- | --- |
|  | 1 | 2 | 3 | 4 |
| Bismuth voltage, v | 1,200 | 1,500 | 1,500 | 1,500 |
| Bismuth current, ma | 112 | 142 | 124 | 120 |
| Tellurium voltage, v | 1,500 | 1,200 | 900 | 600 |
| Tellurium current, ma | 62 | 51 | 37 | 28 |
| Total gas pressure, μ | 18 | 14 | 13 | 12 |
| Deposition time, min | 60 | 60 | 80 | 80 |
| Film thickness, A | 4,100 | 3,400 | 3,240 | 2,730 |
| Bismuth analysis, mg. Bi | $1.8_9$ | $2.2_2$ | $2.5_2$ | $2.4_0$ |
| Tellurium analysis, mg. Te | $2.0_0$ | $1.2_7$ | $0.95_4$ | $0.46_9$ |
| Atomic ratio, g.-atom Bi/g.-atom Te | $0.57_3$ | $1.0_7$ | $1.6_2$ | $3.1_3$ |
| Refractive index | 2.07 | 2.20 | 2.20 | 2.20 |

Figure 2:
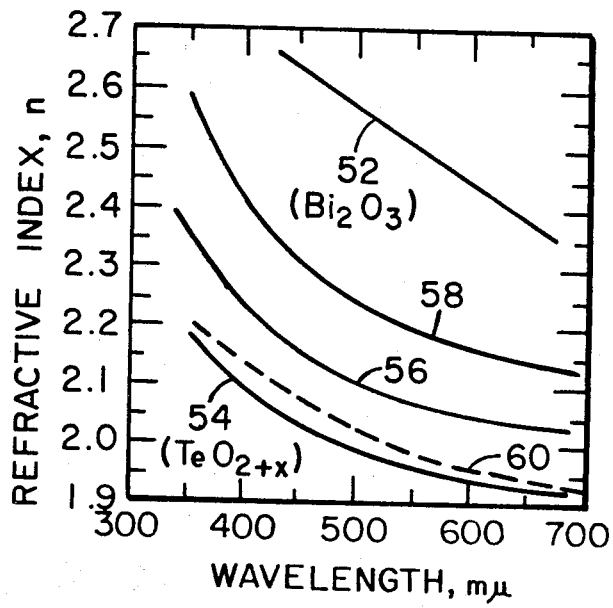
FIG. 2 is a graph of refractive index plotted against wavelength for films of various compositions.

The sputtered films were amorphous, the pure bismuth oxide films being brown in color whereas the pure tellurium oxide films are virtually colorless. In FIG. 2, the refractive indices of the films of Table I are plotted as a function of wavelength. Curve 52 represents the refractive index of $Bi_2O_3$ while curve 54 represents that of $TeO_{2+x}$. The presence of higher oxides of tellurium, e.g., $Te_2O_5$ and $TeO_3$, was noted in the analysis of the tellurium oxide containing films, but the presence of $TeO_2$ was no excluded. Consequently, these films are designated $$TeO_{2+x}(>x>1)$$

Curve 56 represents the refractive index of Example 1 in Table I, and curve 58 represents the refractive indices of the mixed oxide films listed as Examples 2 through 4 in Table I.

Figure 3:
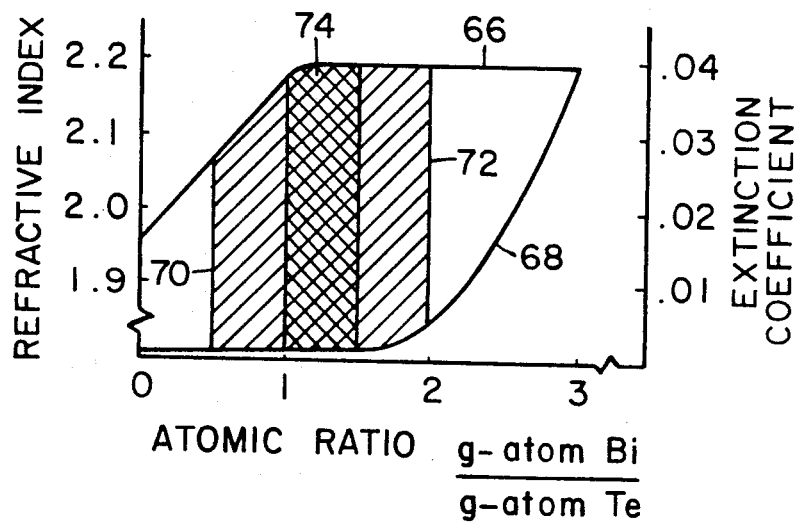
FIG. 3 is a graph depicting the relationship between both refractive index and extinction coefficient as a function of the atomic ratio of g.-atom Bi/g.-atom Te.

For convenience in comparing film properties, refractive index values will be given for a wavelength of 5460 A. and extinction coefficient values for a wavelength of 4500 A. FIG. 3 is a graph of the above-mentioned properties plotted against the atomic ratio g.-atom Bi/g.-atom Te, curve 66 pertaining to index of refraction and curve 68 pertaining to extinction coefficient. Amorphous tellurium oxide films (atomic ratio Bi/Te is zero) have a refractive index of 1.96 and an extinction coefficient less than 0.001. As the ratio of the atomic weights of bismuth to tellurium increases from 0 to 1.07, the refractive index increases to 2.20 while the extinction coefficient remains less than about 0.001. As the atomic ratio of bismuth to tellurium is further increased to 1.62 and 3.13, the refractive index remains substantially constant at 2.20 while the extinction coefficient increases ultimately to 0.041. As the atomic ratio is still further increased the extinction coefficient and then the refractive index approach the values obtained for amorphous bismuth oxide films; namely, an extinction coefficient of 0.11 and a refractive index of 2.51. In films having atomic ratios (Bi/Te) between 0.5 and 2.0, the refractive index is relatively high, i.e., somewhat greater than 2.0 and the extinction coefficient is relatively low, i.e., less than 0.005. This range is indicated by the cross-hatched area between lines 70 and 72. The preferred mixed oxide films have atomic ratios between 1.0 and 1.5 as indicated by the double-hatched area 74. In this narrower range of atomic ratios, the refractive index is greater than 2.15 and the extinction coefficient is less than 0.001.

All of the mixed oxide compositions listed in Table I exhibit greater devitrification resistance than do films of pure $Bi_2O_3$ or $TeO_{2+x}$. For all of the mixed oxide films listed in the table, crystallization occurs at about 500° C. This is significantly better than pure $Bi_2O_3$ films which crystalized after being heated at 245° C. for one hour. The mixed oxide films also exhibited a greater devitrification resistance than amorphous tellurium oxide films which crystallized at 400–450° C.

Other amorphous mixed-oxide films containing bismuth oxide and at least one non-absorbing oxide were prepared and were found to be similar in optical properties to the bismuth oxide-tellurium oxide films. Specifically, the following mixed oxide films were prepared: $Bi_2O_3$-$WO_3$, $Bi_2O_3$-$Ta_2O_5$, $Bi_2O_3$-$Sb_2O_5$, and $Bi_2O_3$-$WO_3$-$Sb_2O_5$. In the low atomic ratio (Bi/M) region, i.e., where the ratio of the g.-atoms of bismuth to the g.-atoms of the remaining constituents is less than about 2, virtually colorless films were obtained in all of these systems despite the fact that such films contained significant quantities of bismuth oxide. Thus, the absence of optical absorption in films containing bismuth oxide and at least one non-absorbing oxide represents a somewhat general phenomenon. It appears that relatively large quantities of bismuth oxide can be incorporated in mixed-oxide films to obtain films of high refractive index and low extinction coeffcient, provided the films of the other metal oxides are virtually colorless. The extinction coefficient will be relatively low until the atomic ratio (g.-atom Bi/g.-atom M) exceeds a value of about 2.0. Also, the refractive index is greater than 2.0 if the atomic ratio (Bi/M) exceeds a value of about 0.5.

Especially useful are those oxides containing $Sb_2O_5$ since films containing this oxide were found to be chemically resistant (attacked somewhat by HF but not attacked by HCl, $HNO_3$, $H_2SO_4$ or NaOH). Films of $Sb_2O_5$ are also highly devitrification resistant, one such film remaining largely amorphous after being heated to 550° C. for sixty-seven hours. Amorphous films of $Sb_2O_5$ and $Sb_2O_5$-$WO_3$-$Bi_2O_3$ did not devitrify after being heated at 500° C. for three hours. In addition to being resistant to devitrification and to chemical attack, amorphous films containing antimony pentoxide are virtually absorption-free and have a relatively high refractive index. The refractive index $n_D$ of $Sb_2O_5$ is 1.97, the refractive index vs. wavelength curve being illustrated in FIG. 2 as curve 60.

I claim:
1. An optical device comprising
   a transparent substrate, and
   an amorphous, mixed oxide film disposed on a surface of said substrate, said film consisting essentially of an oxide of bismuth and an oxide of a metal selected from the group consisting of tellurium, antimony, tungsten, tantalum and combinations thereof, the atomic ratio of bismuth to said metal being between 0.5 and 2.0, the refractive index of said film being greater than 2.0 and the extinction coefficient thereof being less than 0.005.

2. An optical device in accordance with claim 1 wherein the atomic ratio of bismuth to said metal is between 1.0 and 1.5.

3. An optical device in accordance with claim 1 wherein said metal includes antimony.

4. An optical device in accordance with claim 1 wherein said metal is tellurium.

5. A method of depressing the absorption coefficient of reactively sputtered bismuth oxide containing films while retaining a refractive index greater than 2.0 comprising reactively sputtering simultaneously with said bismuth oxide an oxide of at least one metal selected from the group consisting of antimony, tellurium, tantalum, tungsten and combinations thereof, the sputtering parameters being such that atomic ratio of bismuth to said metal in the resulting mixed oxide film is between 0.5 and 2.0.

6. A method in accordance with claim 5 wherein the atomic ratio of bismuth to said metal in the resulting mixed oxide film is between 1.0 and 1.5.

References Cited

UNITED STATES PATENTS

| | | | |
|---|---|---|---|
| 3,004,875 | 10/1961 | Lytle | 117—33.3 |
| 3,547,517 | 12/1970 | Searight et al. | 350—1 X |
| 2,676,117 | 4/1954 | Colbert et al. | 117—124 X |
| 3,078,693 | 2/1963 | Lytle | 117—124 X |

FOREIGN PATENTS

| | | | |
|---|---|---|---|
| 822,295 | 10/1959 | Great Britain | 117—124 |

MURRAY KATZ, Primary Examiner

M. R. P. PERRONE, Jr., Assistant Examiner

U.S. Cl. X.R.

117—124 A, 124 B, 169 R; 350—1, 164, 165, 166